F. J. MELLEN & B. A. EDWARDS.
RECOIL CHECK.
APPLICATION FILED NOV. 11, 1908.
924,913.
Patented June 15, 1909.
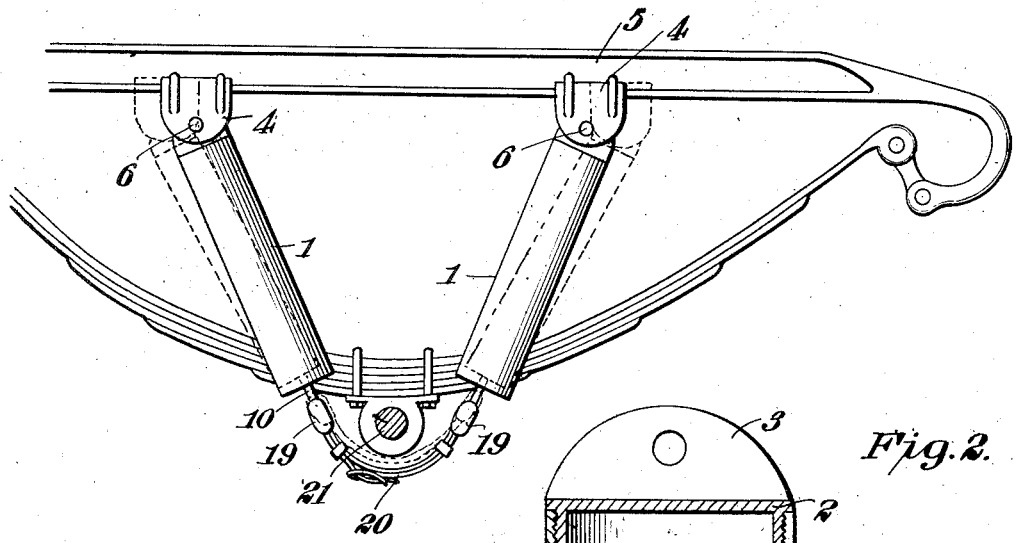
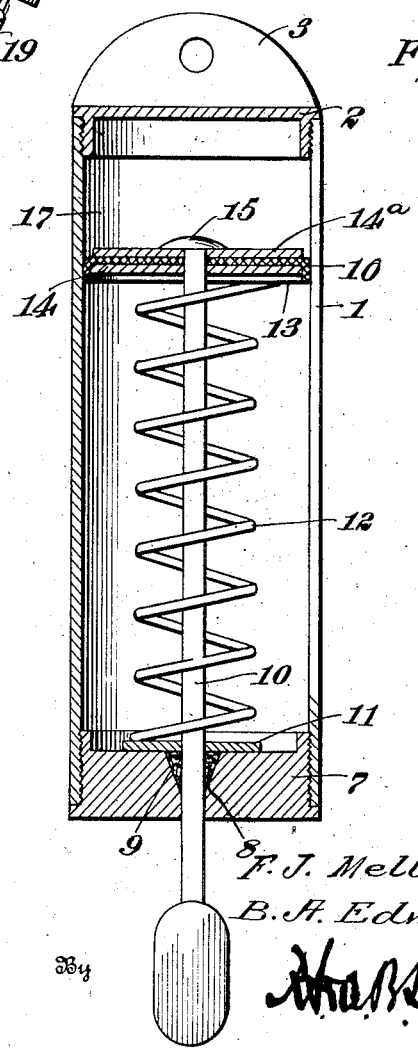

UNITED STATES PATENT OFFICE.

FREDERICK J. MELLEN AND BURTON A. EDWARDS, OF BELOIT, WISCONSIN.

RECOIL-CHECK.

No. 924,913.　　　　　Specification of Letters Patent.　　　Patented June 15, 1909.

Application filed November 11, 1908.　Serial No. 462,077.

*To all whom it may concern:*

Be it known that we, FREDERICK J. MELLEN and BURTON A. EDWARDS, citizens of the United States, both residing at Beloit, in the county of Rock and State of Wisconsin, have invented certain new and useful Improvements in Recoil-Checks, of which the following is a specification.

The object of our invention is to provide a recoil check or compensator adapted to take up or resist vibratory movement of attached or relatively movable parts of an object or objects and is more particularly designed for use in connection with vehicle bodies whereby a violent vibratory movement of the body is prevented and the shock efficiently resisted by the recoil check.

The invention contemplates the construction and arrangement of the several parts of a check device comprising a cylinder wherein the movement of a piston within the cylinder is retarded or partially resisted by a vacuum created by its movement and further resisted at a predetermined point by a spring interposed between the piston and end closure of the cylinder.

For a full understanding of the invention and the merits thereof and also to acquire a knowledge of the details of construction and of the means for effecting the result, reference is to be had to the following description and accompanying drawings, in which:—

Figure 1 is a side elevation of the device mounted upon a vehicle; Fig. 2 is a vertical sectional view of the device; and, Fig. 3 is an enlarged detail illustration.

Corresponding and like parts are referred to in the following description and indicated in all the views of the drawings by the same reference characters.

Referring to the drawings, the numeral 1 designates a cylinder threaded internally for a short distance from both ends, one end of which is closed by an externally threaded cap 2 screwed into the internally threaded cylinder end.

3 designates a transverse rib integrally a part of the cap 2 and is designed to form a link by which the device is secured to the vehicle frame. As shown in Fig. 1, an adjustable clip or clamp 4 is mounted upon the vehicle frame 5 and the rib 3 is inserted between the extremities of the clamp and retained by a pin 6 which protrudes through registering openings in said rib and clamp extremities. The opposite end of the cylinder is closed by an externally threaded cap or head 7 screwed into the internally threaded cylinder end, and said cap or head is formed with an inclined or conical opening 8 designed as a stuffing box in which suitable packing 9 is placed and through which the piston rod 10 is permitted to move longitudinally. The displacement of the packing 9 within the stuffing box is prevented by a washer 11 which rests flat upon the inner side of the cap 7 and is retained thereagainst by a spiral spring 12 interposed between said washer and the piston 13 carried at the inner extremity of the piston rod 10. Said piston 13 preferably comprises two washers 14 and 14ª of slightly smaller diameter than the cylinder 1, retained at the inner end of the piston rod on one side by the spring 12, and at the opposite side by the head 15 formed upon the extremity of said rod. A leather or other flexible washer 16 designed as packing is placed between the washers and deflected at its edge to occupy the space formed between the washers 14 and the inner surface of the cylinder. The parts are so constructed and arranged that a vacuum chamber 17 is formed between the piston 13 and the end of the cylinder closed by the cap 2, and an air compression chamber 18 between the piston 13 and the end of the cylinder closed by the cap 7.

The numeral 19 designates a link or bail-shaped member secured to the exposed end of the piston rod 10 and to which a strap or chain 20 is fastened, which is designed to extend below the vehicle axle 21 and connect the piston rods 10 of two oppositely arranged cylinders or check devices. When the device is arranged upon a vehicle, the cylinders are secured to the vehicle frame 5 at both sides of the axle 21 as shown in Fig. 1 and any desired distance therefrom by the adjustable clamps 4. By such an arrangement, the tension of the strap 20 is adjusted to regulate the operative position of the device to effect and reduce the vibratory movement of the vehicle frame, and to avoid sudden or violent shocks.

The operation of the device when secured to a vehicle is as follows:—The cylinders are attached to the vehicle frame 5 at one extremity and the piston rods 10 connected by the strap 20, said strap extending under the axle 21 at the desired tension and regulated by movement of the adjustable clamp upon the vehicle frame as illustrated in dotted lines in Fig. 1. Upon extreme vibratory movement or sudden shock to either the axle or frame, the frame in its upward movement or the axle in its downward movement away from the frame, will cause the strap to tighten, and the pistons operating within the cylinder incident to the stress placed upon the straps, will effectually take up and reduce the violence of such vibratory movement or shock, consequent upon the vacuum created in chamber 17 by movement of the piston 13. The resisting efficiency of the vacuum formed within the cylinder is further increased by the tension placed upon the spring 12 and the compression of air within the chamber 18 upon movement of the piston 13, and the piston rod and piston are returned to their normal positions by the action of said spring and compressed air upon release of the tension exerted on the strap 20.

It will of course be understood that the device may be secured to any convenient part of a vehicle frame or body and when secured in its proper relative position to a vehicle axle, will effectually prevent severe strain upon the springs and connected parts of the vehicle, whereby by its gradually increasing resisting power the effect of a violent shock is gradually but effectually counteracted.

Having thus described the invention, what is claimed as new is:—

1. A check device comprising a cylinder provided at one end with a cap, said cap being formed with a central recessed opening designed to form a stuffing box, a piston rod operating through the opening in said cap, packing in said recessed opening and surrounding said piston rod, a piston carried by the piston rod, a washer mounted upon the piston rod and designed as a closure for the recessed opening in said cap, a spiral spring carried by the piston rod and interposed between said piston and washer to retain the latter in its proper position against the cap and to hold the piston in its normal position within the chamber, and a cap or closure for the opposite end of said cylinder.

2. A check device comprising a cylinder provided at one end with a cap, said cap being formed with a central recessed opening designed to form a stuffing box, a piston rod operating through the opening in said cap, packing in said recessed opening and surrounding said piston rod, washers secured to the inner extremity of the piston rod, a flexible washer or packing interposed between said washers and extending beyond the margin thereof designed to form an air-tight frictional contact with the inner surface of the cylinder, a washer mounted upon the piston rod and designed as a closure for the recessed opening in said cap, a spiral spring carried by the piston rod and interposed between said piston and washer to retain the latter in its proper position against the cap and to hold the piston in its normal position within the chamber, and a cap or closure for the opposite end of said cylinder.

In testimony whereof we affix our signatures in presence of two witnesses.

FREDERICK J. MELLEN. [L. S.]
BURTON A. EDWARDS. [L. S.]

Witnesses:
   T. R. HARPER,
   IDA I. WARD.